July 19, 1938.  J. G. HANSON  2,124,192
TRANSMISSION
Filed Feb. 3, 1936  3 Sheets-Sheet 1

INVENTOR
John G. Hanson
BY
Popp & Popp
ATTORNEYS

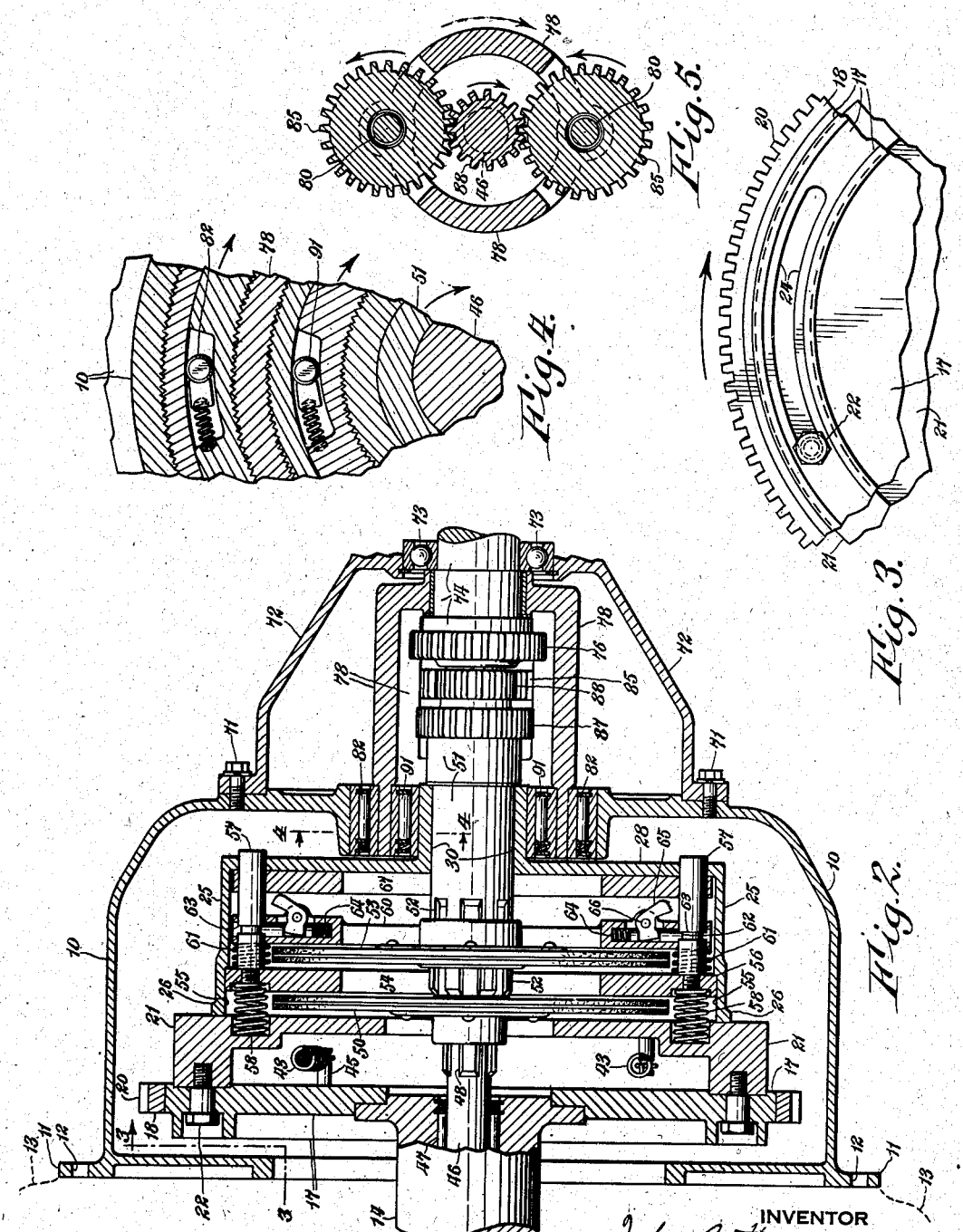

INVENTOR
John G. Hanson
BY
Popp & Popp
ATTORNEYS

Patented July 19, 1938

2,124,192

UNITED STATES PATENT OFFICE 2,124,192

TRANSMISSION

John G. Hanson, Kenmore, N. Y., assignor to H and T Engineering Corporation, Kenmore, N. Y., a corporation of New York Application February 3, 1936, Serial No. 62,015

8 Claims. (Cl. 74—260)

This invention relates to a transmission of the general type used in an automobile to permit the engine to rotate at such speed as to furnish its full power and yet permit the vehicle to be propelled at a wide range of speeds.

The principal object of the invention is to provide a transmission which will be entirely automatic in its operation (eliminating the ordinary clutch pedal and gear shift lever) and, in addition to this, will automatically effect a change from one gear ratio to another at whatever particular vehicle speed is most suitable for the particular conditions involved. Another object of the invention is to obtain this result and still provide a transmission that has more than two forward speeds. A still further object of the invention is to provide a transmission of this character which is simple and reliable in operation and compact and inexpensive in construction. Numerous other collateral objects of the invention and practical solutions thereof are disclosed in detail in the herein patent specification and in the accompanying drawings, wherein:—

Fig. 2 is a fragmentary and substantially horizontal section thereof, taken on line 2—2, Fig. 7.

Fig. 3 is a fragmentary end elevation of the driving disk and associated parts, taken on line 3—3, Fig. 2.

Fig. 4 is an enlarged, fragmentary, vertical, transverse section through the over-running clutches, taken on line 4—4, Fig. 2.

Fig. 5 is a vertical, transverse section through the planetary gear system, taken on line 5—5, Fig. 1.

Similar characters of reference indicate like parts in the several figures of the drawings.

Figure 1:
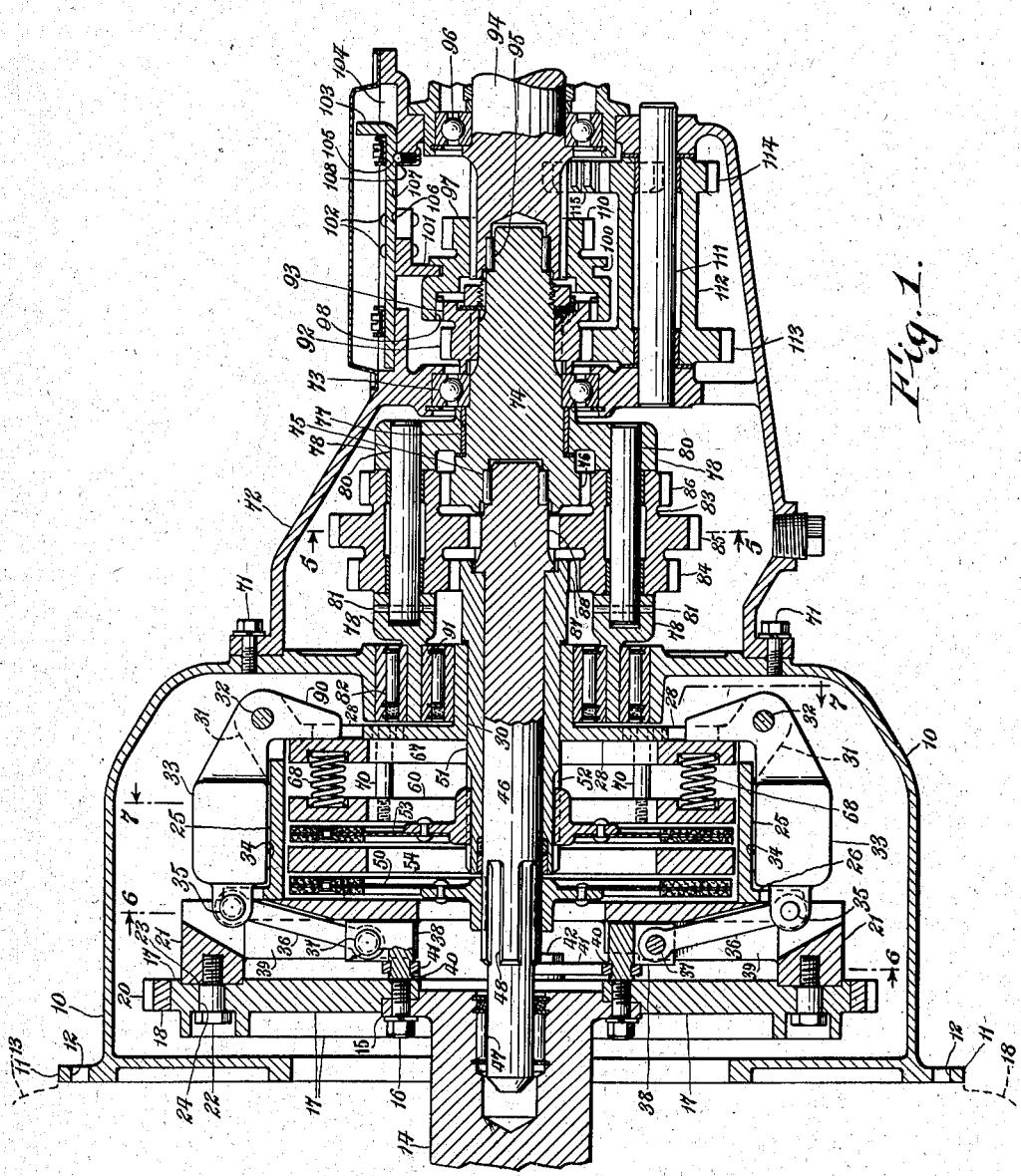
Fig. 1 is a vertical, longitudinal section through the entire transmission, taken on line 1—1, Fig. 7.

It has become conventional practice to secure a transmission directly to the rear end of the engine with which it is associated, and the present transmission is so arranged, the primary casing 10 of the present invention being provided with a suitable lateral flange 11 and bolt holes 12 so as to enable said casing to be bolted directly to the rear end of the engine indicated at 13. The engine is provided with the usual crank shaft, which, as far as the present invention is concerned, constitutes a drive shaft 14 and will be hereinafter so denominated.

Secured to the hub 15 which is formed at the rear end of said drive shaft 14 (by means of cap screws 16 or otherwise) is a thin, light flywheel 17. The annular rim of this flywheel is preferably provided with a hardened steel ring gear 18 secured in place by a shrink fit and having its periphery provided with gear teeth 20 which are adapted to mesh with the pinion gear of an engine starter in the usual and well known manner.

Coaxially arranged behind said flywheel is a torque ring 21 which (see Figs. 3 and 2) is connected to said flywheel by an annular row of shouldered cap screws or supporting screws 22 which are screwed longitudinally into the torque ring 21 until their shoulders 23 come into contact with the front face of said ring. The heads of said supporting screws 22 prevent longitudinal rearward displacement of the torque ring 21 relatively to the flywheel 17, while the unthreaded, enlarged shanks of each of said supporting screws 22 is received within a companion arcuate slot 24 formed in the flywheel 17. Thus the torque ring 21 is supported upon the flywheel, but is capable of rotating a limited amount relatively thereto.

Figure 7:
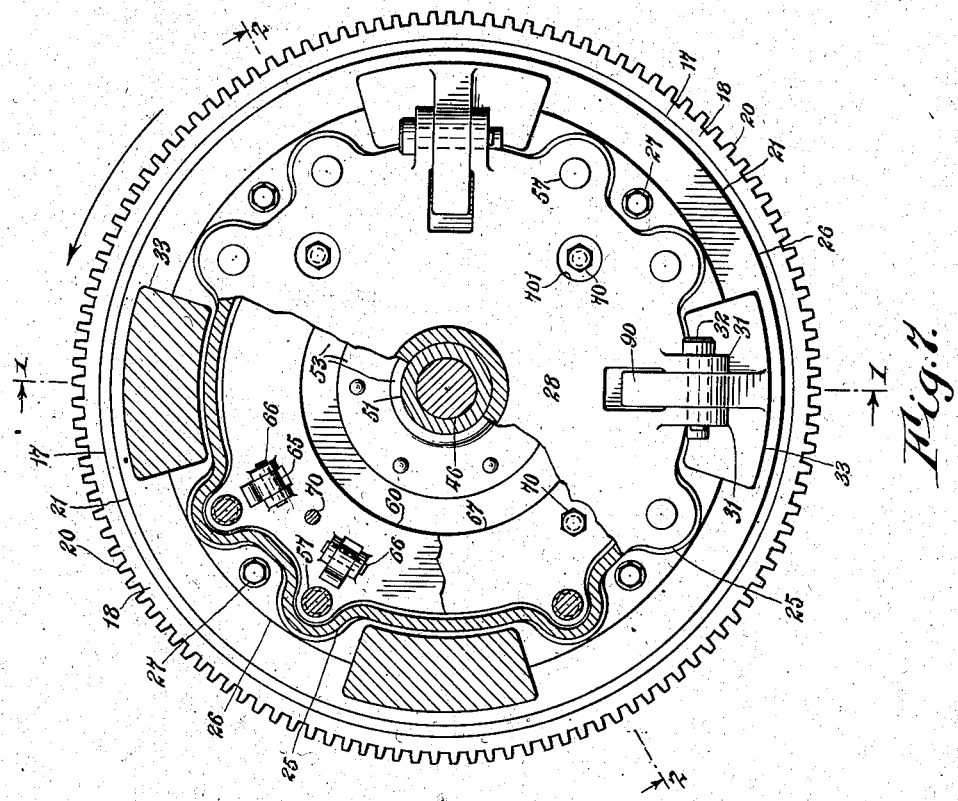
Figs. 6 and 7 are vertical, transverse sections through the transmission, taken on correspondingly numbered lines of Fig. 1.

Secured coaxially to the rear face of said torque ring 21 is a drum 25, which is provided with a lateral flange 26 (see Fig. 7) that is secured to said torque ring by cap screws 27. The drum is also provided at its rear end with a vertical, rear, end wall 28 which merges at its central part into a hub 30. Projecting obliquely outwardly from the rear periphery of said drum 25 are four pairs of ears 31 in each pair of which is pivoted at 32 a bell crank centrifugal weight 33. A tit 34 is formed on the inner front face of said centrifugal weight 33 for the purpose of preventing said weight from moving inwardly beyond the position shown in the drawings. The front end of each weight is pivoted at 35 to the outer end of a tension link 36. The inner end of each tension link is pivoted at 37 to a slide block 38 which is arranged to slide radially on the front face of the torque ring 21 by the provision of a pair of parallel guides 39 formed integrally with and projecting longitudinally forward from the front face of the flywheel 17. Each slide block 38 is preferably bifurcated at its outer end to embrace the inner end of its companion tension link 36 and to receive the opposite ends of the pivot 37.

Figure 6:
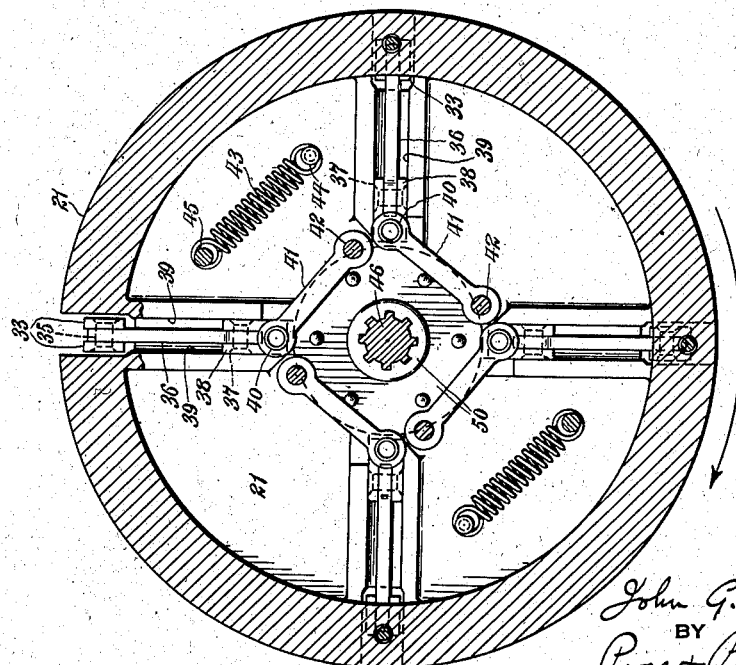

The inner end of each slide block 38 is provided with an integral, longitudinal, forwardly projecting post 40 upon which is pivoted the counterclockwise end (as seen in Fig. 6) of a drag link 41. The opposite or clockwise end of each drag link 41 is pivoted at 42 to the rear face of the flywheel 17.

It is preferred that suitable resilient means be employed to urge the centrifugal weights 33 inwardly, as, for instance, by a pair of tension, centripetal springs 43 (see Figs. 6 and 2) which are symmetrically and tangentially disposed in a plane which is transverse of the drive shaft 14. The clockwise end (as seen in Fig. 6) of each centripetal spring 43 is hooked over a post 44 which projects forwardly from the front face of the torque ring 21, while the counter-clockwise end of each centripetal spring 43 is hooked over a post 45 which projects rearwardly from the rear face of the flywheel 17.

It is thus seen that when any force opposes rotation of the torque ring 21 (resistence offered by the inertia of the automobile and the forces of friction and air resistance opposing its movement), the torque force obtained from the engine tends to centripetally pull the centrifugal weights 33 inwardly, while the rotative speed of the drum 25 tends to force said centrifugal weights outwardly against the centripetal forces represented by the torque of the flywheel 17 and the relatively minor resilient force of the centripetal springs 43.

Arranged concentrically within the drum 25 is a low-speed shaft 46 which is journaled at its front end in the drive shaft 14 in any suitable manner such as in the needle bearings 47 illustrated. This low-speed shaft 46 is provided adjacent its front end with integral, longitudinal splines 48 upon which is slidably mounted a concentric, low-speed clutch disk 50. The central and rear portions of this low-speed shaft 46 is rotatably received within the bore of an intermediate-speed sleeve 51 which is provided at its front end with integral, longitudinal splines 52 upon which is slidably mounted a concentric intermediate-speed clutch disk 53.

Intermediately of said clutch disks 50 and 53 is a concentric two-faced gripping plate 54 which is longitudinally, slidably arranged in the drum 25 within the annular counter bore 55. The rear end of this counter bore 55 terminates at 56 so that the two-faced gripping plate 54 is prevented from moving further rearwardly than the position shown in the drawings. Secured to said two-faced gripping plate 54 and extending longitudinally rearwardly therefrom is an annular row of slide pins 57 whose rear ends pass through and are slidably supported by the rear end wall 28 of the drum 25. The two-faced gripping plate 54 is always urged resiliently rearward toward the position shown in the drawings by an annular row of relatively weak, low-speed-clutch-disengaging, compression springs 58. These springs are prevented from lateral displacement by having their front and rear ends received within suitable recesses formed in the rear side of the torque ring 21 and front side of the two-faced gripping ring 54, respectively.

Disposed just to the rear of the intermediate-speed clutch disk 53 is a one-faced gripping plate 60 which is slidably supported upon the slide pins 57. The one-faced gripping plate 60 is resiliently urged away from the two-faced gripping plate 54 by a plurality of relatively light, intermediate-speed-clutch-disengaging, compression springs 61, each of which encircles one of the slide pins 57 intermediately of the two-faced gripping plate 54 and the one-faced gripping plate 60.

In the position of the parts as shown in the accompanying drawings, the one-faced gripping plate 60 is prevented from moving longitudinally, with respect to the slide pins 57 upon which it is mounted, by the provision of a plurality of latch dogs 62 which are radially, slidably arranged in an annular row in said one-faced gripping plate 60. Each of said latch dogs 62 has a tooth at its outer end which is adapted to engage with an annular groove 63 formed in the companion slide pin 57. Each latch dog 62 is resiliently urged outwardly by a compression spring 64. Disengagement of each latch dog 62 from its companion slide pin 57 is effected by a companion, bellcrank, trip lever 65 which is centrally pivoted at 66 on the rear side of the one-faced gripping plate 60. The forwardly projecting arm of each trip lever 65 is bifurcated and embraces a reduced section or neck portion suitably formed in its companion latch dog 62 so that movement of said trip lever 65 causes its companion latch dog 62 to move in a radial direction.

Disposed concentrically and intermediate of the one-faced gripping plate 60 and the rear end wall 28 of the drum 25 is a thrust plate 67 which slides upon, and is supported by, the slide pins 57. This thrust plate is at all times resiliently urged rearwardly relatively to the one-faced gripping plate 60 by an annular row of very stiff, compression springs 68. Each of said stiff springs 68 is restrained against lateral displacement by being received at its opposite ends within suitable recesses formed in the rear side of the one-faced gripping plate 60 and front side of the thrust plate 67, respectively. Said thrust plate 67 is, however, prevented from moving further away from the one-faced gripping plate 60 than the distance shown in the drawings, by the provision of an annular row of shouldered, limiting screws 70. The shank of each of these limiting screws 70 passes through a suitable companion hole drilled longitudinally in the thrust plate 67, while the heads of each limiting screw is adapted to engage with the rear face of said thrust plate 67. The extreme front end of each limiting screw is screwed into a companion threaded hole which is tapped longitudinally in the one-faced gripping plate 60. For purposes of clearance, the rear end wall 28 of the drum 25 is provided with the holes 701 (see Fig. 7) so as to prevent the heads of the limiting screws 70 interfering with the position or action of the thrust plate 67. These holes 701 are also useful for purposes of adjustment and assembly.

Secured by cap screws 71 to the rear end of the primary casing 10 is a secondary casing 72. Journaled at its intermediate part in ball bearings 73 in said secondary casing 72 is a stub shaft 74, whose front end is bored out so as to be suitably journaled on needle bearings 75 on the reduced rear end of the low speed shaft 46. The front end of said stub shaft 74 is suitably cut peripherally to form the concentric, driven gear 76. This gear and all the other gears of the transmission are shown as plain spur gears but it is obvious that helical gears may be employed if desired.

Journaled at its rear end on a bushing 77 on said stub shaft 74 is a planetary head 78 of substantially cylindrical form but peripherally cut away at its opposite sides (see Figs. 5 and 1) to receive a pair of longitudinal planetary spindles 80. The opposite ends of each spindle 80 are suitably supported in said planetary head 78 and each spindle is restrained against longitudinal displacement by a suitable retaining pin 81. The front end of said planetary head 78 is journaled in the primary casing 10 in any suitable manner, such as in the combined bearing and over-running clutch 82 illustrated.

Rotatably arranged on each of the two planetary spindles 80 is a triple, planetary, gear cluster 83 comprising the intermediate speed transfer gear 84, the low-speed transfer gear 85 and the common transfer gear 86. These three gears mesh as follows:—A. The intermediate speed transfer gear 84 of each planetary gear cluster 83 meshes with an intermediate-speed, driving gear 87 which is coaxially and peripherally formed at the rear end of the intermediate-speed sleeve 51, B. The low-speed transfer gear 85 of each planetary gear cluster 83 meshes with a low-speed driving gear 88 which is coaxially and peripherally formed near the rear end of the low-speed shaft 46, and C. The common transfer gear 86 of each planetary gear cluster 83 meshes with the driven gear 76 of the stub shaft 74.

Idling speed

Let us now assume that the engine 13 is driving the drive shaft 14 at idling speed and that the vehicle is standing still. The power from the drive shaft 14 is then passing through the drag links 41 and the tension links 36 to the centrifugal weights 33, thereby causing the drum 25 to rotate with and at the same speed as said drive shaft 14. We will further assume that this idling speed is sufficiently low, and the strength of the centripetal springs 43 sufficiently powerful, that the centrifugal weights 33 are not able to move outwardly away from the position shown in the drawings despite the rotation of the drum 25 upon which they are mounted. Under these conditions both of the clutch disks 50 and 53 are disengaged and are therefore stationary and no power is transmitted to the stub shaft 74.

Low speed

We will now assume that the operator wishes to move the vehicle ahead. To do this he speeds up the engine 13 (by opening the carburetor throttle) as much above idling speed as may be desired, depending on what speed of vehicle acceleration he desires. This speeding up of the engine causes the speed of the drum 25 to increase until the centrifugal force of the centrifugal weights 33 overcomes the resilient resistance of the centripetal springs 43 and the low-speed, clutch disengaging springs 58. This permits said centrifugal weights to move outwardly and their inwardly extending arms 90 to move forwardly, thereby causing the thrust plate 67 to be moved forwardly. The stiffness of the springs 68 and the initial compression to which they have been subjected by the limiting screws 70 prevents, at this time, any movement of the thrust plate 67 relatively to the one-faced gripping plate 60, the heads of the limiting screws 70 being, at this time, in contact with the rear face of said thrust plate 67. Thus the one-faced gripping plate 60 is caused to move forwardly together with the thrust plate 67. Because of the position of the latch dogs 62 at this time, this forward movement is directly imparted by said one-faced gripping plate 60 to the slide pins 57 and by them to the two-faced gripping plate 54. The latter thereupon grips the low-speed clutch disk 50 between the front face of said two-faced gripping plate 54 and the rear face of the torque ring 21. This causes the power emanating from the flywheel 17 and passing through the torque ring 21 to be transmitted to the low-speed clutch disk 50 and thence to the low-speed shaft 46 and through its low-speed driving gear 88 to the low-speed transfer gear 85 and common transfer gear 86 of the planetary gear cluster 83 and to the driven gear 76 of the stub shaft 74. As said stub shaft 74 is connected to the driving wheels of the vehicle (in a manner to be described in detail hereinafter), it follows that the transmission has now been shifted into low gear and that the vehicle has been caused to move ahead at a low rate of speed. While this is occurring, the planetary head 78 is prevented from rotating in a counter-clockwise direction (as seen in Fig. 4) by the "free-wheeling" or over-running clutch 82, aforedescribed.

If this clutch engagement tends to become a trifle harsh, this tendency toward harshness automatically imparts a heavier torque load on the flywheel 17. This additional load (being carried through the links 41 and 36) permits the flywheel 17 to travel ahead of the torque ring 21 i. e. to a further advanced clockwise position. It is to be understood that the parts are, at this time, not in the position shown in Fig. 3, inasmuch as the centrifugal weights 33 have moved outwardly and pulled the torque ring ahead of the flywheel, so that the torque ring supporting screws 22 are not at one end of the arcuate slots 24, as shown in Fig. 3, but are "floating" in some position intermediate the ends of their companion slots. This travelling ahead of the flywheel, due to the tendency toward harsh clutch engagement, immediately causes the centrifugal weights 33 to be drawn inwardly against the centrifugal force to which they are being subjected. This allows the two-faced gripping plate 54 to move slightly rearward, under the influence of the low-speed, disengaging springs 58, and this slight rearward movement permits of a slight slippage of the low-speed clutch disk 50. This slippage, in turn, permits the drum 25 to rotate at a higher speed and the clutch to again be engaged more and more firmly, but at no time harshly, as any tendency toward harsh clutch engagement is immediately counteracted as just described. Thus a very "soft" clutch engagement is automatically but nevertheless positively obtained.

It has just been stated that as soon as any tendency toward harsh clutch engagement occurs, the flywheel 17 is enabled to move ahead of the torque ring 21. The effect of this action is not only to cause a partial disengagement of the clutch but, in addition, there occurs another and further helpful effect which is based upon the inertia and momentum forces involved. This effect results from the fact that, when a momentarily excessive torque is imposed upon the drive shaft 14 and when, as a consequence, its flywheel 17 moves ahead of the torque ring 21, there is a momentary release of said torque due to the fact that, momentarily, said flywheel is not forced to meet the full force of inertia represented by the weight of the entire vehicle and the various parts thereof whose motion is transmitted to or from the flywheel 17. It is true that some of these forces are, in effect, resiliently connected to the flywheel by elements which are somewhat elastic such as, for instance, the propeller shaft 94. There are, on the other hand, certain moving parts which would be, in effect, inflexibly connected with the flywheel if it were not for the "floating" connection between the flywheel and the torque ring 21. This includes such parts as the drum 25, the three rings 54, 60 and 67, etc.

As the inertia of the vehicle is gradually overcome, it is obvious that the torque force between the flywheel 17 and torque ring 21 gradually drops, and the speed of the drum 25 gradually increases. This causes the centrifugal weights 33 to exert a greater forward pressure on the two-faced gripping plate 54, thereby gripping the low speed clutch disk 54 more and more firmly at higher speeds of the drum 25, when there is the greatest tendency for the clutch to slip. This whole action, it should be noted, is not a direct function of engine speed (or carburetor throttle opening) and can occur even though no change whatsoever is made in the engine speed, providing the engine has been given enough throttle to overcome its initial inertia. Otherwise the only effect of lower engine speed or smaller throttle opening is that the acceleration of the vehicle is slower than it would be with a higher engine speed and a larger throttle opening.

Intermediate speed

When the speed of the drum 25 has become sufficiently high and the torque force imposed by the flywheel 17 upon the links 41 and 36 has become sufficiently low (not due to less power but to lower vehicle acceleration, or other lower resistance to vehicle propulsion), the centrifugal weights 33 move out far enough and with enough force to oppose the stiff springs 68 and to then move the thrust plate 67 toward the one-faced gripping plate 60. This movement causes said thrust plate 67 to actuate all of the trip levers 65 and to release each of their companion latch dogs 62. As soon as this occurs the relatively-weak, low-speed-clutch-disengaging springs 58 move the two-faced gripping plate 54 rearwardly out of engagement with the rear face of the low-speed clutch disk 50 and into engagement with the front face of the intermediate-speed, clutch disk 53. In the meantime, the one-faced gripping disk 60 has moved forwardly a short distance, under the influence of the stiff springs 68. The latter cannot, however, move said one-faced gripping plate 60 very far forward as any excessive movement of this sort is prevented by the limiting screws 70.

This causes the intermediate-speed, clutch disk 53 to be gripped between the two plates 54 and 60. The power from the flywheel 17 is now caused to flow from the drum 25 through said intermediate-speed, clutch disk 53 to the intermediate-speed sleeve 51 and thence through its driving gear 87 to the planetary transfer gears 84 and 86 and to the driven gear 76 of the stub shaft 74. Here, just as in the case of the low-speed clutch disk 50, a very soft clutch engagement is automatically effected by the balancing of the declutching force derived from the torque load and the clutch engaging force derived from the speed of the engine 13 through the "floating" links 41 and 36 to the drum 25, these two forces acting in opposite directions on the centrifugal weights 33 whose position determines both the clutch action and the gear ratio of the transmission.

Here too, as before, the action may take place without any change in engine speed or throttle opening. This statement is made to emphasize the fact that all of the changes in gear ratio in this invention are effected automatically and are not a direct function of the engine speed or throttle opening and that the engine speed or throttle opening may be said to only effect the acceleration of the vehicle, i. e. the speed of acceleration of the car in each gear ratio and the speed of the changes of the gear ratios.

High speed

As before, when in low and in intermediate gear, the inertia of the vehicle, resulting from the change in vehicle speed, while in gear, is overcome at whatever acceleration is desired by the operator, who is in control of the engine throttle. When this overcoming of the inertia becomes consummated, the centrifugal force exerted by the centrifugal weights 33 (tending to move said centrifugal weights outward) becomes increasingly powerful. At the same time the torque force acting between the flywheel 17 and torque ring 21 (and tending to pull the centrifugal weights inward) decreases. Both of these effects help to move the centrifugal weights 33 outward and the result is an increased forward thrust on the thrust plate 67. When this force has become sufficient to overcome the force of the low-speed, clutch-disengaging springs 58, all of the plates 54, 60 and 67 are moved forwardly (together with the ever more strongly embraced intermediate-speed clutch disk 53) until the low-speed, clutch disk 50 is gripped between the rear side of the torque ring 21 and the front side of the two-faced, gripping ring 54.

When this occurs the drum 25 has become connected with both of the clutch disks 50 and 53. It is obvious that power cannot flow to the planetary gear clusters 83 from both the low-speed drive gear 88 and the intermediate-speed, drive gear 87 because of their different diameters. The consequence is that said planetary gear clusters 83 are locked, relatively to the low-speed shaft 46 and to the intermediate-speed sleeve 51, and thus said planetary gear clusters 83 and their planetary head 78 are caused to rotate as a unit. This causes the stub shaft 74 to be driven at the same speed as the drum 25. This constitutes the high gear ratio of the transmission.

This just described engagement of what has been heretofore termed the low-speed clutch disk 50 is, in effect, the engagement of the high-speed ratio of the transmission. It is to be noted that this high-speed gear ratio engagement is caused to automatically be soft in action in the same manner as the soft engagements of the low gear ratio and the intermediate gear ratio, i. e. that any tendency toward harsh clutch action immediately causes an increase in torque pressure between the flywheel 17 and torque ring 21 and thereby causes the centrifugal weights to be pulled inwardly and causing a release of the pressure on the clutch as much as may be necessary to effect a soft clutch engagement.

Non free wheeling

To permit of maximum flexibility in the handling of a vehicle, it is desirable, whenever the driver rapidly closes the throttle with the purpose of rapidly slowing down the speed of the vehicle, that the engine be used as a brake to help effect this result. Such an action may be denominated "non free wheeling" and is obtained in the present invention by the provision of an over-running clutch 91 which is arranged between the front annular flange of the planetary head 78 and the hub 30 of the drum 25. This over-running clutch 91 is so arranged (see Fig. 4) that the planetary head 78 can never move faster than the drum 25, and any tendency to do so causes said drum to be locked to said planetary head and causes the engine 13 to be used as a brake under these particular circumstances. While the engine is thus being used as a brake, but before the speed of the vehicle and engine has been radically reduced, any tendency toward harsh action of this over-running clutch 91 is prevented. This is by reason of the fact that any sudden counter-clockwise torque (as seen in Fig. 6) applied to the flywheel 17, from the torque ring 21, is resiliently opposed by both the centripetal springs 43 and also by the inertia to outward movement of the centrifugal weights 33, this inertia force being carried to said weights through the links 41, 36 from the flywheel 17. These two factors cause a clutch slippage if the applied clockwise torque is excessively sudden and/or powerful.

*Deceleration*

When the vehicle is travelling in high gear and the operator reduces the throttle opening (usually with the engine 13 acting as a brake) the speed of the engine and the vehicle, if continuing to be reduced, reaches a point where the centripetal springs 43, aided by the various clutch springs, are enabled to pull the centrifugal weights 33 inwardly a sufficient distance to allow the low-speed, clutch disengaging springs 58 to push the two-faced gripping ring 54 backwardly out of engagement with the low speed clutch disk 50. This puts the transmission automatically into intermediate gear, inasmuch as the intermediate-speed clutch disk 53 is still being gripped, and aforesaid low-speed clutch disk 50 disengaged. If the operator now wishes to speed up the vehicle he can do so with maximum effectiveness by reason of the fact that the vehicle speed has dropped so low as to warrant picking up speed in the intermediate gears before the transmission again shifts to high.

We will now assume that, instead of decelerating the vehicle to a speed at which the transmission automatically shifts to intermediate gear (as just described), the operator does not slow the speed down to this point but does slow it down to a particular speed, within what may be termed the "intermediate-gear range". By the later phrase is meant that range of speeds at which the transmission will be in intermediate gear when accelerating the engine under any and all operating conditions.

We will now assume that the operator opens the throttle at this particular speed in the upper part of said "intermediate-gear range". In this event either of two results may occur depending on the action of the operator and the condition of the roadway: 1. If at this time the operator only opens the engine throttle a small amount or the vehicle encounters only a slight grade, then the transmission will stay in high gear while the vehicle gains speed or, 2. If the operator opens the throttle a relatively large amount, or if the vehicle encounters a relatively steep grade, then the transmission will first drop back into intermediate gear and will stay in this intermediate gear until the most appropriate time for changing to high occurs (unless, of course, the operator again decelerates or the vehicle starts to roll down a hill).

The reasons for these almost humanly intelligent actions under different circumstances may be explained as follows: The whole action of the present invention is a function of the position of the centrifugal weights 33. The position of these weights depends upon the speed of the drum 25 and the torque force imposed upon the links 41 and 36. The speed of the drum 25 is a function of the speed of the drive shaft 14 and the speed of the propeller shaft 74, while the torque force upon the links 41 and 36 is a function of the torque force of the drive shaft 14 and the torque resistance of the propeller shaft 74. Hence the automatic action of the transmission depends upon these four variables.

Because of these facts, when the vehicle in high gear decelerates to a speed in the upper part of the "intermediate-gear range", with the transmission still in high, said transmission will stay in high if the torque force of the drive shaft 14, or the torque resistance of the propeller shaft 94, is not greatly increased, because at this time the speed of both the propeller shaft and the drive shaft is high and hence the drum 25 is being rotated rapidly and the centrifugal weights thrown out with more centrifugal pressure than can be overcome by the small centripetal pressure caused by the torque forces emanating from either the drive shaft or the propeller shaft. But if, instead of the foregoing, the operator opens the throttle wider, or if the vehicle encounters a sharp rise in the road at this time, then the transmission shifts to second gear, because, in this event, the torque force of the driving shaft 14 and/or the torque resistance of the propeller shaft 94 creates a centripetal pressure on the centrifugal weights 33 which is sufficient to overcome the centrifugal pressure thereof.

If the speed of the vehicle decelerates still more to a point in the lower part of the "intermediate-gear range" and then only opens the throttle slightly or only encounters a slight rise in the road, the transmission will shift into intermediate gear because at this lower speed of the vehicle, the smaller centrifugal pressure of the centrifugal weights 33 is unable to counteract the centripetal pressure derived from the torque forces even though the latter be relatively small. Hence, under these conditions, the centrifugal weights move inwardly and the transmission caused to shift automatically to intermediate gear in the manner previously described.

If in this lower part of the "intermediate-gear range", the operator opens the throttle wider or encounters a steeper rise in the road, the transmission will in both cases shift to intermediate gear because of the dual effect of the strength of the centripetal pressure and the weakness of the centrifugal pressure.

It is to be particularly noted that, in all of these cases in which the speed of the vehicle dropped to a point within the "intermediate-gear range", the transmission did not shift to intermediate gear unless conditions were such as to render the use of said intermediate gear desirable. Furthermore, this improved transmission is so intelligent that, under the particular conditions here being considered, it will refuse to change to intermediate gear unless this gear is actually to be used, no change from high to intermediate being effected unless this change is both needed and is taken advantage of.

On the other hand, let us assume that, instead of going from intermediate to high, the operator had slowed the vehicle down to a very low speed or to a standstill. Under these circumstances, as the speed of the vehicle is reduced, the first action which occurs is that the low speed springs 58 push back the two-faced gripping plate 54 to the rear shoulder 56 of the counter bore 55. The intermediate-speed, clutch disengaging springs 61 are, at this time, pushing the one-faced, gripped plate 60 rearwardly, and this causes the latter, in turn, to push back the thrust plate 67 because of the stiff springs 68 which press the one-faced gripping plate 60 and thrust plate 67 apart from each other as far as is permitted by the limiting screws 70. Hence, as soon as the centrifugal weights 33 have moved inwardly a sufficient distance to allow a sufficient retraction of said thrust plate 67, the intermediate-speed, clutch-disengaging springs 61 push said one-faced gripping ring 60 sufficiently backwardly, to disengage the intermediate-speed, clutch disk 53. Finally when the speed of the vehicle has become sufficiently reduced, the intermediate springs 61 push the one-faced gripping plate 60 and the thrust plate 67 clear back to the position shown in the drawings. In this position the annular grooves 63 of the slide pins 57 register with the noses of the latch dogs 62. As a consequence of this said latch dogs are pushed outwardly by their springs 64 so that the noses of said latch dogs engage with said grooves 63 and thereby lock the one-faced gripping plate 60 to the slide pins 57.

Both the low-speed and the intermediate-speed clutch disks 50 and 53 are now disengaged and the transmission has been automatically shifted back to its original neutral gear ratio without having required the operator to actuate a clutch pedal or its equivalent. The present invention is so arranged in general that this shifting back to neutral may be caused to occur at whatever speed is desired, i. e. it may be caused to occur when the vehicle has practically come to a standstill, or when the vehicle has slowed down to a speed of a few miles an hour. In either case, however, the action is such that, under the conditions assumed, the transmission automatically shifts itself back to neutral. Furthermore, as all the parts of the transmission are back again in the position shown in the drawings, it naturally follows that as soon as the operator opens the throttle wider, the transmission will again automatically shift first into low gear and then into intermediate and high if the operator, during these changes, does not reduce the throtle opening.

Reverse

A driving reverse gear 92 is secured by suitable splines and a suitable clamping nut (with a lock washer) to the central part of the stub shaft 74. The rear part of said driving reverse gear 92 is integrally connected with a male clutch element 93 of gear shape.

A propeller shaft 94 is suitably bored out at its front end to receive the needle bearings 95 whereby said propeller shaft is journaled directly on the rear end of the stub shaft 74. Further to the rear, said propeller shaft 94 is directly journaled in the secondary casing 72 on ball bearings 96. The front end of said propeller shaft is peripherally splined to slidably receive the splined bore of a shift member 97, and the front end of the latter is provided with a female clutch element 98 which is of internal gear shape and is adapted to engage with the male clutch element 93 aforementioned. This shift member is provided with a suitable annular groove 100 which receives the lower end of a shift fork 101, thereby permitting said shift member, whether rotating or not, to be shifted longitudinally to any one of three positions (forward, neutral and reverse) by said shift fork 101. The latter is secured, by rivets 102 or otherwise, to the lower face of a slide plate 103 which is slidably supported in a longitudinal guide 104 suitably arranged in the secondary casing 72. A spring loaded ball detent 105 is preferably arranged in the secondary casing 72 so as to resiliently engage with any one of the three sockets 106, 107 or 108 formed in the lower face of said slide plate 103, thereby resiliently holding the shift member 97 in any one of its three positions. Said shift member 97 is also provided integrally at its extreme rear end with a driven reverse gear 110.

Arranged longitudinally in the rear end of the secondary casing 72, directly below the stub shaft 74 and propeller shaft 94, is a jack spindle 111 upon which is journaled a reverse gear cluster 112. The front gear 113 of said reverse gear cluster 112 is in constant mesh with the driving reverse gear 92 while the rear gear 114 of said reverse gear cluster is in constant mesh with a reverse gear pinion 115 which is suitably journaled in the secondary casing 72 in the usual and well known manner.

When the shift member 97 is in the position shown in the drawings, the male clutch element 93 is in engagement with the female clutch element 98, thereby effecting a direct power connection between the stub shaft 74 and the propeller shaft 94. Under these conditions, the vehicle is either standing still with both clutches 50 and 53 disengaged, as shown in the drawings, or is travelling forwardly in either low, intermediate or high speed.

If the operator wishes to drive the vehicle in a rearward direction, he moves the shift member 97 to its extreme rearward position, thereby disengaging from each other the clutch elements 93 and 98 and engaging the driven reverse gear 110 of said shift member with the reverse gear pinion 115.

Uncoupler

If the operator wishes to speed up the motor for the purpose of testing it or for any other purpose, but does not wish to cause any forward or backward movement of the vehicle, he moves the shift member 97 to a position intermediate of the two positions just described. To do this he moves the slide plate 103 until the ball detent 105 engages with the "uncoupler" notch 107.

Conclusion

From all of the foregoing it will be apparent that in the normal operation of this improved transmission, the action is entirely automatic, the operator needing to do nothing (as far as the transmission is concerned) to cause the vehicle, when starting from a standstill, to go into any forward speed or back into any lower forward speed or even back to a standstill. Furthermore, he does not have to gradually open the throttle to bring the car up to any given speed, but may instantly open the throttle to whatever position provides the particular acceleration he desires and the transmission will automatically pass softly through the various gear ratios and finally bring the car to such a speed in high gear as corresponds to the particular throttle position at the time. If he desires faster car acceleration, he merely opens the throttle wider without danger of racing the motor. He can even open the throttle to its full opening with the vehicle standing still and thereby obtain maximum car acceleration from a standstill, without danger to the engine or transmission and without any manipulation other than the opening of the throttle.

Furthermore, the change from one gear ratio to another is not a direct function of vehicle speed but depends upon how fast the operator wishes to accelerate the car as controlled by the amount of throttle opening. If he opens the throttle just a small amount, the transmission shifts from low to intermediate and then to high at a relatively low speed of acceleration. If, however, the operator opens the throttle very wide, the shifting from low to intermediate and then to high takes place at a much higher speed of acceleration. In other words, when the operator desires faster acceleration he opens the throttle wider and the transmission stays in any certain gear ratio longer before shifting to the next higher gear ratio. This is due to the fact that the gear ratios of the transmission are changed by two different forces which act in different manners upon the transmission, these two forces being the centripetal force which is a function of engine torque force or propeller torque resistance and the centrifugal force which is a function of engine speed and vehicle speed. The only time the operator needs to manually actuate anything associated with this improved transmission is when he desires to go into reverse or when he desires to uncouple the transmission for the purpose of speeding up the engine for testing or other purposes and with the vehicle standing still. In the latter two instances he moves the slide plate 103 to the particular position which corresponds to the result desired, i. e. he pushes the slide plate 103 until the ball detent 105 engages with the notch 106 or 107. Then when he desires to move forwardly, he returns said slide plate 103 to the position shown in the drawings, with the ball detent 105 in engagement with the notch 108. This slide plate may then be left in this position with no manipulation whatsoever required of the operator, until he desires to either uncouple the engine or to reverse the vehicle.

I claim as my invention:

1. A transmission comprising: a low-speed gear train; a low-speed clutch disk connected to one end thereof; an intermediate-speed gear train; an intermediate-speed clutch disk connected to one end of said intermediate-speed gear train; a propeller shaft connected to the other ends of said gear trains; a drive shaft; a drum connected therewith; a two-faced gripping plate arranged between said clutch disks and provided with a slide pin; a one-faced gripping plate disposed adjacent the outer side of one of said clutch disks; means for actuating said one-faced gripping plate; and latching means arranged between said one-faced gripping plate and the slide pin.

2. A transmission comprising: a low-speed gear train; a low-speed clutch disk connected to one end thereof; an intermediate-speed gear train; an intermediate-speed clutch disk connected to one end of said intermediate-speed gear train; a propeller shaft connected to the other ends of said gear trains; a drive shaft; a drum connected therewith; a two-faced gripping plate arranged between said clutch disks and provided with a slide pin; a one-faced gripping plate disposed adjacent the outer side of one of said clutch disks; latching means arranged between said one-faced gripping plate and said pin; a thrust plate arranged to move longitudinally in the drum and adapted to unlatch said latching means; a spring between said one-faced gripping plate and said thrust plate; and means for actuating said thrust plate.

3. A transmission comprising: a low-speed gear train; a low-speed clutch disk connected to one end thereof; an intermediate-speed gear train; an intermediate-speed clutch disk connected to one end of said intermediate-speed gear train; a propeller shaft connected to the other ends of said gear trains; a drive shaft, a drum connected therewith; a two-faced gripping plate arranged between said clutch disks and provided with a slide pin; a relatively light spring arranged between said two-faced gripping plate and the drum; a one-faced gripping plate disposed adjacent the outer side of one of said disks; latching means arranged between said one-faced gripping plate and the slide pin; a thrust plate; a relatively heavy spring arranged between said one-faced gripping plate and said thrust plate; and means for actuating said thrust plate.

4. A transmission comprising: a low-speed gear train; a low-speed clutch disk connected to one end thereof; an intermediate-speed gear train; an intermediate-speed clutch disk connected to one end of said intermediate-speed gear train; a propeller shaft connected to the other ends of said gear trains; a drive shaft; a drum connected therewith; a two-faced gripping plate arranged between said clutch disks and provided with a slide pin; a relatively light spring arranged between said two-faced gripping plate and the drum; a one-faced gripping plate disposed adjacent the outer side of one of said disks; a very light spring arranged between said one-faced gripping plate and said two-faced gripping plate.

5. A transmission comprising: a low-speed gear train; a low-speed clutch disk connected to one end thereof; an intermediate-speed gear train; an intermediate-speed clutch disk connected to one end of said intermediate-speed gear train; a propeller shaft connected to the other ends of said gear trains; a drive shaft; a drum connected therewith; a two-faced gripping plate arranged between said clutch disks and provided with a slide pin; a relatively light spring arranged between said two-faced gripping plate and the drum; a one-faced gripping plate disposed adjacent the outer side of one of said disks; latching means arranged between said one-faced gripping plate and the slide pin; a thrust plate; a relatively heavy spring arranged between said one-faced gripping plate and said thrust plate; means for definitely limiting the extent to which said one-faced gripping plate is allowed to move away from said thrust plate; and means for actuating said thrust plate.

6. A transmission comprising: a low-speed gear train; a low-speed clutch disk connected to one end thereof; an intermediate-speed gear train; an intermediate-speed clutch disk connected to one end of said intermediate-speed gear train; a propeller shaft connected to the other ends of said gear trains; a drive shaft; a drum connected therewith; a two-faced gripping plate arranged between said clutch disks and provided with a slide pin; a one-faced gripping plate disposed adjacent the outer side of one of said clutch disks; means for limiting the movement of said two-faced gripping plate relatively to the drum in the direction of said one-faced gripping plate; means for actuating said one-faced gripping plate; and latching means arranged between said one-faced gripping plate and the slide pin.

7. A transmission comprising: a low-speed gear train; a low-speed clutch disk connected to one end thereof; an intermediate-speed gear train; an intermediate-speed clutch disk connected to one end of said intermediate-speed gear train; a propeller shaft connected to the other ends of said gear trains; a drive shaft; a drum connected therewith; a two-faced gripping plate arranged between said clutch disks and provided with a slide pin; a one-faced gripping plate disposed adjacent the outer side of one of said clutch disks; latching means arranged between said one-faced gripping plate and the slide pin; and means for actuating said one-faced gripping plate in accordance with the differential between the speed of the drum and the torque of the drive shaft.

8. A transmission comprising: a low-speed gear train; a low-speed clutch disk connected to one end thereof; an intermediate-speed gear train; an intermediate-speed clutch disk connected to one end of said intermediate-speed gear train; a propeller shaft connected to the other ends of said gear trains; a drive shaft; a drum connected therewith; a two-faced gripping plate arranged between said clutch disks and provided with a slide pin; a one-faced gripping plate disposed adjacent the outer side of one of said clutch disks; latching means arranged between said one-faced gripping plate and said pin; a thrust plate arranged to move longitudinally in the drum and adapted to unlatch said latching means, the actuation of said thrust plate being in accordance with the differential between the speed of the drum and the torque on the drive shaft.

JOHN G. HANSON.